Patented July 1, 1941

2,247,821

UNITED STATES PATENT OFFICE 2,247,821

MANUFACTURE OF TRIALKYL BORONS

Robert F. Ruthruff, Chicago, Ill., assignor to Chempats Incorporated, a corporation of Delaware No Drawing. Application December 4, 1939, Serial No. 307,447

16 Claims. (Cl. 260—607)

This invention relates to methods for producing trialkyl borons.

The various trialkyl borons are well known chemical compounds, and several methods for their preparation have been described. For example, it has been suggested that trialkyl borons be prepared by the interaction of zinc alkyls and ethyl borate. Other investigators have prepared trialkyl borons by the action of alkyl magnesium halides upon methyl borate. Additionally, a very general reaction for the production of tri substituted borons involves the interaction of the suitable Grignard reagent with boron fluoride, used in the form of the boron fluoride—ethyl ether complex. I have found that trialkyl borons may be readily prepared by the interaction of alkyl aluminum dihalides or dialkyl aluminum halides or a mixture of the two with a boron halide, either as such or in the form of a boron halide complex. While any boron halide may be employed, boron fluoride is by far the most reactive member of the group and is hence preferred. By the practice of my invention trialkyl borons, with the exception of trimethyl boron, may be prepared in an easy and convenient method which makes unnecessary the use of alkyl halides as intermediates. In the preparation of trimethyl boron by the practice of my invention, the methyl halide required as an intermediate is rapidly and easily converted into a liquid derivative for use in the subsequent synthesis.

One object of my invention is to provide an improved method for the synthesis of trialkyl borons. A further object of my invention is to provide a method for the preparation of trialkyl borons from alkyl aluminum halides. Additionally, an object of my invention is to provide an improved method for the synthesis of trimethyl boron from methyl halides. Further objects of my invention will become evident from the following description.

For the better understanding of my invention, its use in the preparation of triethyl boron will now be described. It should be understood that the following description is illustrative only and in no way limits the scope of my invention.

*Example 1.*—A reactor is charged with an intimate mixture of anhydrous aluminum chloride and finely divided metallic aluminum. A mixture in the weight ratio 3:1 has proved satisfactory. If desired, the mixture may be pelleted before use, mounted on an inert support, placed in layers on trays or otherwise suitably disposed in the reactor. It has been found that superior results follow when activated aluminum is used, that is, aluminum that has been superficially amalgamated by contact with an aqueous or alcoholic solution of mercuric chloride or aluminum that has been converted in part into a bimetallic couple by contact with an aqueous or alcoholic solution of salts of copper, cadmium, zinc, or iron, for example.

Ethylene, or gases containing ethylene, is passed through the catalyst-filled reactor preferably at superatmospheric pressure, for example at a pressure of 750–3000 pounds per square inch, and at moderate temperatures, for example 100–200° C. A mixture containing ethyl aluminum dichloride, diethyl aluminum chloride, and polymerized hydrocarbon results. Improved results follow if the gas charge contains hydrogen to an amount at least equal to half the olefine by volume. If desired, the alkyl aluminum halides may be separated from the polymer hydrocarbon by fractionation or otherwise, or the whole mixture as produced may be used in the following step. In this description it will be assumed that the whole mixture is used.

The above described mixture, preferably after filtration or separation from sludge by other suitable means, is diluted if desired with an inert solvent such as ether and is then treated with boron fluoride. If an ether solution of the mixed ethyl aluminum chlorides is used, it is more convenient to employ the boron fluoride in the form of the boron fluoride—ether complex, or this reagent may be used even if the reaction mixture is not diluted with ether.

The boron fluoride may be prepared by any known means, for example, by the interaction of calcium fluoride, boron oxide, and sulfuric acid; by the action of sulfuric acid on a mixture of sodium borofluoride and boric oxide; or by the decomposition of aryl diazonium borofluorides.

The boron fluoride or the boron fluoride—ether complex is added with stirring to the ethyl aluminum chloride in the stoichiometric amount or slightly less. After addition is complete, the reaction mixture is kept at a temperature of 50–70° F. for two hours, following which the whole is cooled and decomposed by the slow addition of an excess of cold dilute mineral acid. The resulting organic layer is thoroughly washed with water, is dried and then distilled, under reduced pressure if desired. The triethyl boron is obtained when the temperature reaches 95° C.

In the above process care should be taken throughout to exclude moisture and air, except of course in the final decomposition step. The alkyl aluminum halides are easily hydrolyzed and oxidized, while the trialkyl borons are easily oxidized.

In the above method it is evident that aluminum bromide or other halides of this element may be substituted for aluminum chloride, but this latter reagent is preferable due to its low cost. Also, it is evident that olefines other than ethylene may be employed to give the higher trialkyl borons as final products.

It is obvious that the above method is not suitable for the preparation of trimethyl boron. The variations necessary in the preparation of this compound will now be described.

*Example 2.*—The previously described reactor is filled with aluminum turnings or shavings, which may take the form of activated aluminum prepared as described previously. In addition, it is well to add a small crystal of iodine to act as a catalyst. Methyl chloride is passed through the reactor at moderate pressure, say 15 to 75 pounds per square inch. Usually the reaction starts spontaneously, if not it can be initiated by heating a part of the reactor to, say 100° C. Once started, the reaction is continued at such a rate that the temperature does not rise above 75–100°. This is accomplished by regulating the rate of chloride addition and the amount of cooling applied to the reactor.

The resulting mixture of methyl aluminum dichloride and dimethyl aluminum chloride is treated with boron fluoride or a boron fluoride complex as previously described. In this case, however, it must be remembered that the desired product is a gas (B. P. $-20°$ C.). Accordingly, part is evolved during reaction, the remainder on decomposition.

It is obvious that in this modification other methyl halides may be employed in place of methyl chloride. Also, it is evident that higher alkyl halides will react in an analogous manner and that the higher trialkyl borons may be made from the higher alkyl aluminum halides formed by treating these with boron fluoride or boron fluoride complexes.

This application is a continuation-in-part of my copending application, Serial No. 296,807, filed September 27, 1939.

While the present invention has been described in connection with details or specific examples thereof, it is not intended that these shall be regarded as limitation upon the scope of the invention except insofar as included in the accompanying claims.

I claim:

1. In the method of preparing trialkyl borons the step comprising interacting alkyl aluminum halides with boron fluoride.

2. In the method of preparing trialkyl borons the step comprising interacting alkyl aluminum halides with a compound selected from the group consisting of boron fluoride and ether—boron fluoride.

3. In the method of preparing trialkyl borons the steps comprising contacting an alkyl halide with a substance selected from the group consisting of metallic aluminum and activated metallic aluminum and interacting the resulting alkyl aluminum halides with boron fluoride.

4. In the method of preparing trialkyl borons the steps comprising contacting an alkyl halide with a substance selected from the group consisting of metallic aluminum and activated metallic aluminum and interacting the resulting alkyl aluminum halides with a compound selected from the group consisting of boron fluoride and ether—boron fluoride.

5. In the method of preparing trialkyl borons the steps comprising contacting a gas containing olefines with an aluminum halide in admixture with a substance selected from the group consisting of metallic aluminum and activated metallic aluminum and interacting the resulting alkyl aluminum halides with boron fluoride.

6. In the method of preparing trialkyl borons the steps comprising contacting a gas containing olefines with an aluminum halide in admixture with a substance selected from the group consisting of metallic aluminum and activated metallic aluminum and interacting the resulting alkyl aluminum halides with a compound selected from the group consisting of boron fluoride and ether—boron fluoride.

7. In the method of preparing trialkyl borons the steps comprising contacting of a gas containing olefines and hydrogen with an aluminum halide in admixture with a substance selected from the group consisting of metallic aluminum and activated metallic aluminum and interacting the resulting alkyl aluminum halides with boron fluoride.

8. In the method of preparing trialkyl borons the steps comprising contacting of a gas containing olefines and hydrogen with an aluminum halide in admixture with a substance selected from the group consisting of metallic aluminum and activated metallic aluminum and interacting the resulting alkyl aluminum halides with a compound selected from the group consisting of boron fluoride and ether—boron fluoride.

9. In the method of preparing trimethyl boron the steps comprising contacting a methyl halide with a substance selected from the group consisting of metallic aluminum and activated metallic aluminum and interacting the resulting methyl aluminum halides with boron fluoride.

10. In the method of preparing trimethyl boron the steps comprising contacting a methyl halide with a substance selected from the group consisting of metallic aluminum and activated metallic aluminum and interacting the resulting methyl aluminum halides with a compound selected from the group consisting of boron fluoride and ether—boron fluoride.

11. In the method of preparing triethyl boron the steps comprising contacting an ethyl halide with a substance selected from the group consisting of metallic aluminum and activated metallic aluminum and interacting the resulting ethyl aluminum halides with boron fluoride.

12. In the method of preparing triethyl boron the steps comprising contacting an ethyl halide with a substance selected from the group consisting of metallic aluminum and activated metallic aluminum and interacting the resulting ethyl aluminum halides with a compound selected from the group consisting of boron fluoride and ether—boron fluoride.

13. In the method of preparing triethyl boron the steps comprising contacting a gas containing ethylene with an aluminum halide in admixture with a substance selected from the group consisting of metallic aluminum and activated metallic aluminum and interacting the resulting ethyl aluminum halides with boron fluoride.

14. In the method of preparing triethyl boron the steps comprising contacting a gas containing ethylene with an aluminum halide in admixture with a substance selected from the group consisting of metallic aluminum and activated metallic aluminum and interacting the resulting ethyl aluminum halides with a compound selected from the group consisting of boron fluoride and ether—boron fluoride.

15. In the method of preparing triethyl boron the steps comprising contacting of a gas containing ethylene and hydrogen with an aluminum halide in admixture with a substance selected from the group consisting of metallic aluminum and activated metallic aluminum and interacting the resulting ethyl aluminum halides with boron fluoride.

16. In the method of preparing triethyl boron the steps comprising contacting of a gas containing ethylene and hydrogen with an aluminum halide in admixture with a substance selected from the group consisting of metallic aluminum and activated metallic aluminum and interacting the resulting ethyl aluminum halides with a compound selected from the group consisting of boron fluoride and ether—boron fluoride.

ROBERT F. RUTHRUFF.